United States Patent [19]
Serres et al.

[11] Patent Number: 5,624,609
[45] Date of Patent: Apr. 29, 1997

[54] ENHANCEMENTS TO THE AIR INJECTION DEVICES IN A PAPER PULP FLOW FOR DE-INKING THEREOF

[75] Inventors: Alain Serres, Reims; Alain Meuret; Philippe Colin, both of Vitry Le Francois, all of France

[73] Assignee: E & M Lamort, Vitry Le Francois, France

[21] Appl. No.: 558,316

[22] Filed: Nov. 15, 1995

[30] Foreign Application Priority Data

Nov. 28, 1994 [FR] France .................. 94 14212

[51] Int. Cl.$^6$ ............... B01F 3/04; B03D 1/24
[52] U.S. Cl. ............ 261/36.1; 261/79.2; 261/DIG. 75; 209/170; 210/221.2
[58] Field of Search ............... 209/170; 210/221.2; 261/79.2, 36.1, DIG. 75; 366/165; 162/4

[56] References Cited

U.S. PATENT DOCUMENTS

| | | |
|---|---|---|
| 2,653,801 | 9/1953 | Fontein . |
| 2,938,629 | 5/1960 | Hollingsworth et al. . |
| 3,173,827 | 3/1965 | Altmann et al. . |
| 3,261,593 | 7/1966 | Sharples . |
| 3,334,657 | 8/1967 | Smith . |
| 3,406,953 | 10/1968 | Moore . |
| 3,659,962 | 5/1972 | Zink . |
| 3,862,907 | 1/1975 | Shimotsuma . |
| 4,053,142 | 10/1977 | Johannes . |
| 4,148,721 | 4/1979 | Brown . |
| 4,186,094 | 1/1980 | Hellberg . |
| 4,331,534 | 5/1982 | Barnscheidt . |
| 4,347,128 | 8/1982 | Barnscheidt . |
| 4,370,304 | 1/1983 | Hendriks . |
| 4,389,312 | 6/1983 | Beard . |
| 4,560,474 | 12/1985 | Holik . |
| 4,620,926 | 11/1986 | Linck . |
| 4,627,922 | 12/1986 | Viator et al. . |
| 4,721,562 | 1/1988 | Barnscheidt . |
| 4,726,686 | 2/1988 | Wolf . |
| 4,842,777 | 6/1989 | Lamort . |
| 4,861,165 | 8/1989 | Fredriksson . |
| 5,066,389 | 11/1991 | Zlobin et al. . |
| 5,160,610 | 11/1992 | O'Reilly . |
| 5,236,090 | 8/1993 | Britz . |
| 5,279,424 | 1/1994 | Britz . |
| 5,437,784 | 8/1995 | Meinecke . |

FOREIGN PATENT DOCUMENTS

| | | |
|---|---|---|
| 0256965 | 2/1988 | European Pat. Off. . |
| 0305251 | 1/1989 | European Pat. Off. . |
| 1142527 | 9/1957 | France . |
| 61-282492 | 12/1986 | Japan . |
| 2070967 | 9/1981 | United Kingdom . |

*Primary Examiner*—Thomas M. Lithgow
*Attorney, Agent, or Firm*—Lowe, Price, LeBlanc & Becker

[57] ABSTRACT

An air injector for the foaming of paper pulp, comprised of a hollow cylindrical tube inside which is arranged a cylindrical bore (3) leading into a convergent portion and a divergent portion (2a, 2b, 2c), said cylindrical bore being occluded by a stopper fitted with holes (8) providing a cylindrical air inlet chamber (3a).

6 Claims, 4 Drawing Sheets

ENHANCEMENTS TO THE AIR INJECTION DEVICES IN A PAPER PULP FLOW FOR DE-INKING THEREOF

BACKGROUND OF THE INVENTION

1. Field of the Invention

In the paper pulp recovery industry, de-inking of the pulp of recycled used paper is known to be performed by blowing air into said pulp.

2. Description of the Prior Art

European patent EP 0,305,251 granted to the applicant hereof discloses an air injector of a particular shape enabling a large quantity of air to be blown into a mass of paper pulp to be de-inked and shaped, as well as a large number of air bubbles (operation known as foaming), the ink contained in the pulp thus foamed then attaches itself to the walls of the air bubbles. All that remains to be done is to separate the ink-laden foam from the semi-liquid mass comprised by water and paper pulp.

The injector described in European patent EP 0,305,251 comes in three parts: a set of tubes for injecting the ink-laden pulp; a cylindrical chamber into which air is blown tangentially; a mixing duct comprising a convergent portion and a divergent portion connected together by a cylindrical duct.

OBJECT OF THE INVENTION

This injector produces excellent results and the object of the invention is put such an injector to use.

SUMMARY OF THE INVENTION

A first aspect of the invention relates to the very structure of this injector, said structure being simplified in relation to the description set forth in European patent EP 0,305,251, thus enabling it to be manufactured at a lower cost.

A second aspect of the invention relates to the way such an injector is disposed in a foaming device.

The injector embodying the invention is characterized in that it is constituted by a hollow cylindrical tube whose interior bore comprises: a first part having a divergent tapered bore, a cylindrical bore and a convergent tapered bore; and a second part constituted by a cylindrical bore of diameter greater than that of the convergent tapered bore with which it communicates, this cylindrical bore being fitted, immediately before its junction with the tapered bore, with a tangential hole for the admission of air and being occluded by a part fitted with a bore for the introduction of pulp.

The invention also relates to an injection set comprising plural injectors arranged side by side between two metal plates and surrounded by a wall which, along with the two metal plates, constitutes a tight caisson into which the foaming air is blown.

BRIEF DESCRIPTION OF THE DRAWINGS

As a non-limiting example and for the purpose of making the invention easier to understand, the accompanying drawings represent.

DESCRIPTION OF THE PREFERRED EMBODIMENTS

Figure 1:
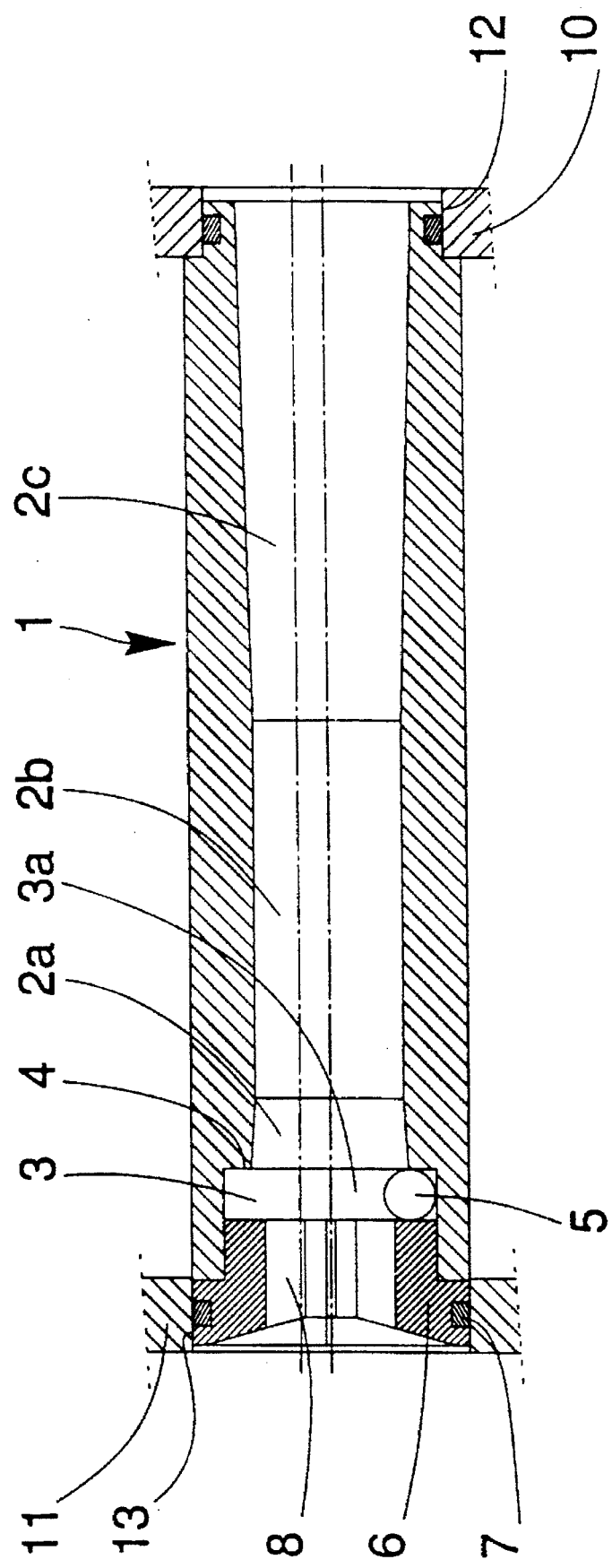
FIG. 1: a longitudinal sectional view of a sample embodiment of the injector embodying the invention.

In reference to these figures and more particularly in reference to FIG. 1, according to the invention the injector bearing the general reference 1 can be seen to be constituted by a hollow cylindrical tube.

The interior bore of the tube 1 comprises a first part 2 in three sections, a convergent section 2a, a divergent section 2c and, between these two, a cylindrical section 2b. The section 2c opens out at thee end of the tube 1. This bore comprises a second part 3 which is a cylindrical bore extending from the other end of the tube 1 up to the bore 2a.

The diameter of the bore 3 is greater than that of the section 2a of the bore 2, thereby providing a shoulder 4. At the level of this shoulder 4, the tube 1 is pierced by a duct 5 which opens tangentially into the bore 3.

The bore 3 is closed by a stopper 6 fitted with a seal 7. The thickness of this stopper is less than the length of the bore 3 by a length "l" which is approximately equal to the diameter of the hole 5, thus providing, at the bottom of the bore 3, a cylindrical air injection chamber 3a which is supplied tangentially via the hole 5.

This stopper 6 is run right through by holes 8, which may or may not communicate with one another. These holes can be comprised of several slots disposed in a star-shaped arrangement. For instance, three slots intersecting at the center of the stopper 6 will produce a drilling constituting a six-pointed star.

Figures 4, 5:
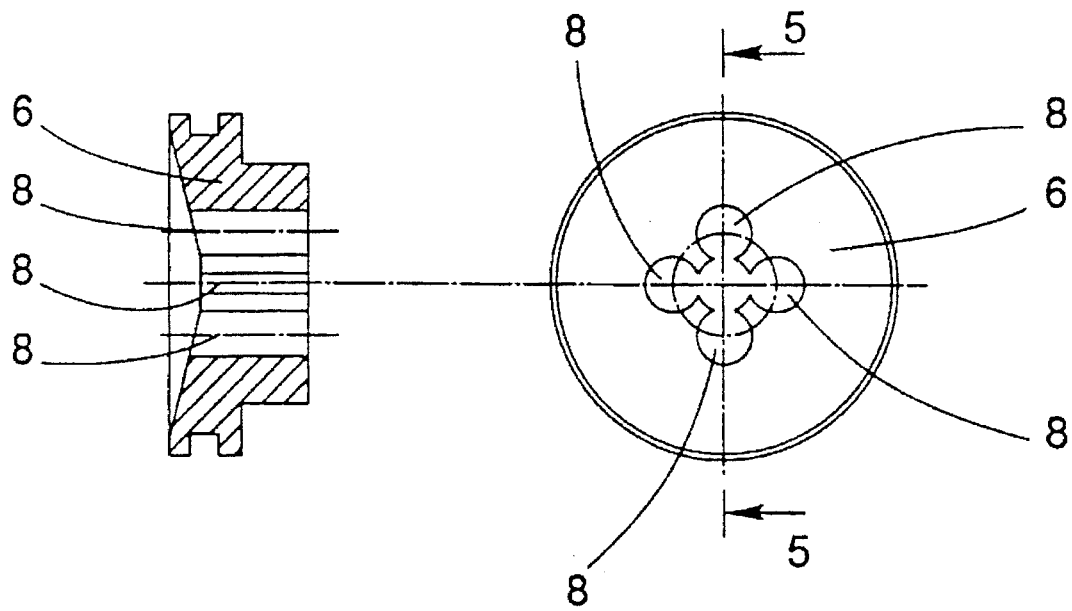
FIG. 4: a horizontal section of a first embodiment of the injector stopper.
FIG. 5: a sectional view along 5—5 of FIG. 4.

FIGS. 4 and 5 represent a first embodiment of the stopper 6 intended for insertion into the bore 3 while providing a cylindrical air injection chamber 3a in this bore.

In reference to these figures, the stopper 6 can be seen to be drilled with five holes 8: a central hole and four holes arranged around said central hole and communicating with it by way of the intersection.

Figures 6, 7:
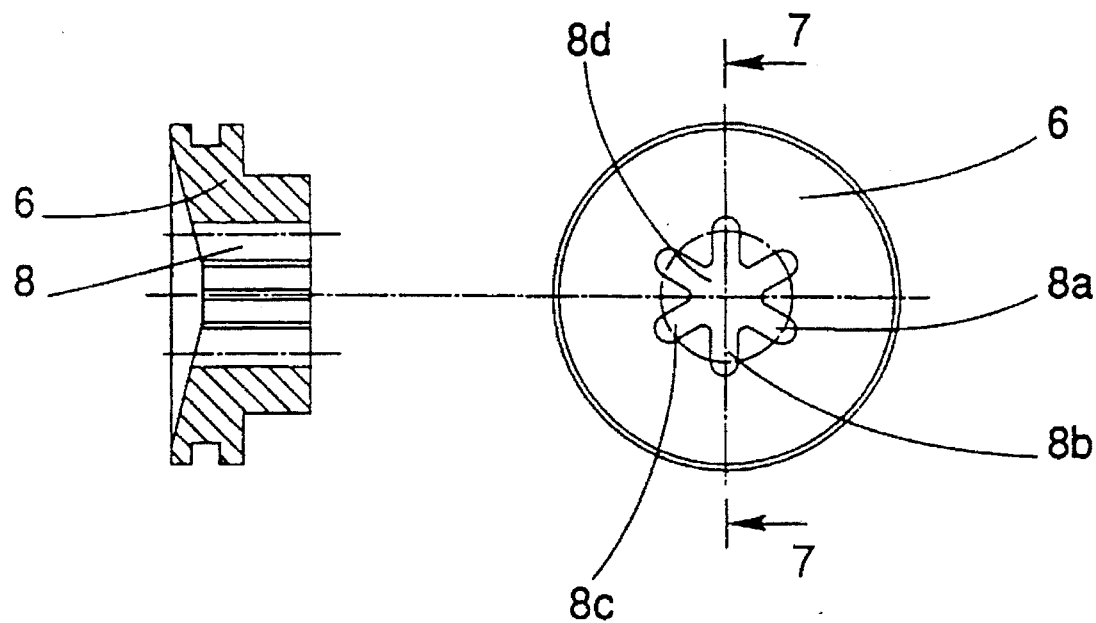
FIG. 6: a horizontal section of a second embodiment of the injector stopper.
FIG. 7: a sectional view along 7—7 of FIG. 6.

In reference to FIGS. 6 and 7, the holes 8 can be seen to be made by means of three slots 8a, 8b and 8c which intersect one another, thus defining a star-shaped drilling and with a larger orifice 8d at the center, this orifice having as center the geometrical point of intersection of the axes of the slots.

The embodiment in FIGS. 6 and 7 has the advantage of avoiding catching of the fibers at the time of injection.

More generally, the boles 8 are made so as to achieve a maximum increase of the contact surface between the air and the pulp when the air is injected. To this end, from a central orifice is arranged a plurality of additional orifices disposed around the central hole with which they communicate; these additional orifices can be circular, as in the case of FIG. 4, or elongated as in the case of FIG. 6.

Figure 2:
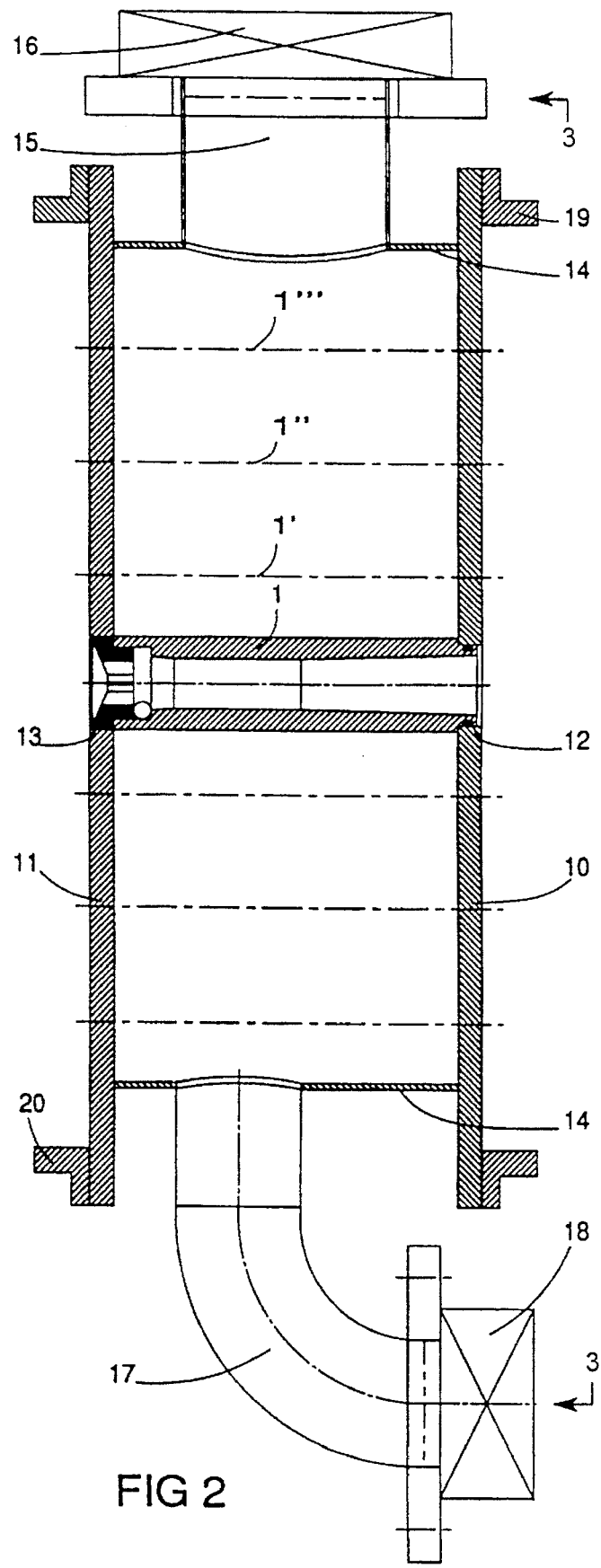
FIG. 2: a sectional view along 2—2 of FIG. 3 of a tight caisson comprising a plurality of injectors according to FIG. 1.
Figure 3:
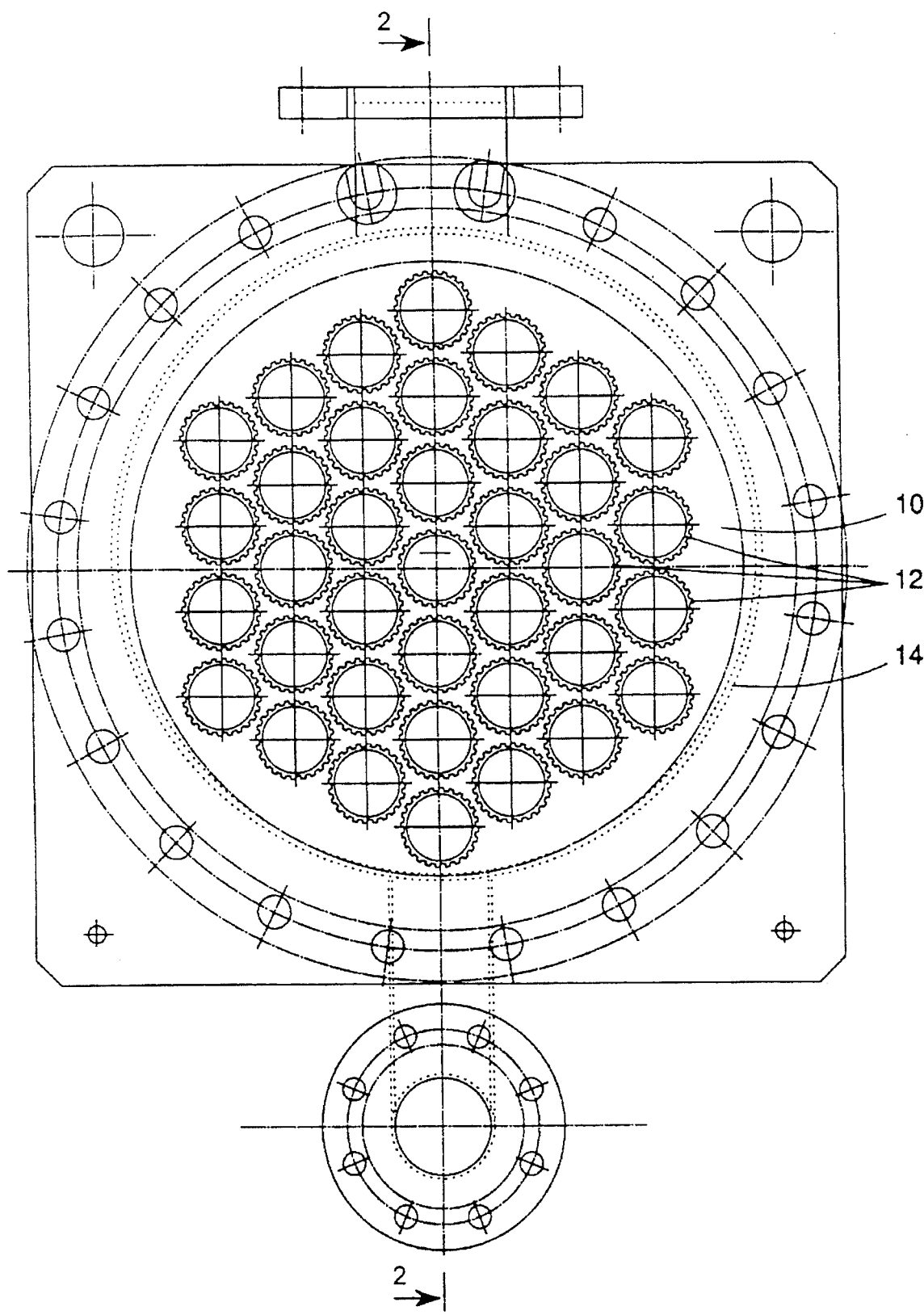
FIG. 3: a view along 3—3 of FIG. 2.

FIGS. 2 and 3 show a side-by-side arrangement, in a caisson, of a plurality of injectors such as the injector represented in FIG. 1.

For this purpose, the injectors are disposed between two parallel plates 10 and 11 drilled with appropriate holes 12 and 13. The plate 10 is fitted with holes 12 in which are embedded the ends of the tubes 1 through which the divergent section 2c of the bore 2 opens out. The plate 11 is fitted with holes 13 which receive the other end of the injector.

In FIG. 2 only one injector has been illustrated, but the broken lines 1', 1", etc. schematically represent the other injectors.

As represented in FIG. 3, the orifices 12 (and therefore the orifices 13 corresponding to it and the injectors which are disposed between two orifices 12 and 13) are disposed according to an arrangement similar to that of the tubes in a boiler, the two plates 10 and 11 being tightly connected to one another by way of a circular shell 14.

The two plates 10 and 11 constitute, along with the shell 14, a tight caisson in which the injectors are placed.

Into this shell opens an air supply pipe 15 controlled by a valve 16, and a water supply pipe 17 controlled by a valve 18.

The caisson constituted by the two plates 10, 11 and the shell 14 is interposed between two chambers 19 and 20 schematically represented in FIG. 2.

The pulp for de-inking is pressurized in the chamber 20 and passes into the holes 8 of each off the injectors. Simultaneously, the pressurized air is let into the caisson via the pipe 15 (the valve 18 being closed). This pressurized air passes through the tangential holes 5 of each injector, thus finding itself blown into the flow of pulp arriving via the holes 8; the pulp/air mixture passes through the injector and enters the chamber 19 via the orifice of the part 2c.

The water pipe 17 enables the interior of the caisson to be cleaned, when necessary.

As indicted in patent, EP 0.305.251, the air blown into each injector causes a large number of air bubbles to appear and the arrangement of a multiplicity of injectors in the caisson 10, 11, 14 enables particularly efficient foaming of the mass of pulp to be de-inked.

We claim:

1. An air injector for the foaming of a mass of paper pulp to be de-inked, comprising a hollow cylindrical tube (1) whose interior bore comprises: a first part (2) having a convergent tapered bore (2a) and a divergent tapered bore (2c) connected to one another by a cylindrical bore (2b), and a second part (3) including a cylindrical bore substantially coaxially with said first part (2) and of a diameter greater than a diameter of the convergent tapered bore (2a) with which it communicates, this cylindrical bore (3) being fitted, immediately before its junction with said convergent tapered bore, with a tangential hole (5) for the admission of air and being occluded by a stopper (6) fitted with an opening (8) for the introduction of the pulp, the thickness of the stopper (6) being less than the length of the bore (3) so as to provide a cylindrical air inlet chamber (3a).

2. The air injector as claimed in claim 1, wherein the opening (8) in the stopper (6) is formed by a central hole and a plurality of peripheral holes intersecting the central holes so as to increase the contact surface between the pulp and the air.

3. The device as claimed in claim 2, wherein the peripheral holes are circular holes.

4. The device as claimed in claim 2, wherein the peripheral holes are obtained by slots.

5. A device for foaming paper pulp to be de-inked, comprising a plurality of injectors arranged side by side in a tight caisson supplied with air, each of the plurality of injectors comprising a hollow cylindrical tube (1) whose interior bore comprises: a first part (2) having a convergent tapered bore (2a) and a divergent tapered bore (2c) connected to one another by a cylindrical bore (2b), and a second part (3) including a cylindrical bore substantially coaxially with said first part (2) and of a diameter greater than a diameter of the convergent tapered bore (2a) with which it communicates, this cylindrical bore (3) being fitted, immediately before its junction with said convergent tapered bore, with a tangential hole (5) for the admission of air and being occluded by a stopper (6) fitted with an opening (8) for the introduction of the pulp, the thickness of the stopper (6) being less than the length of the bore (3) so as to provide a cylindrical air inlet chamber (3a).

6. The device as claimed in claim 5, wherein the caisson is comprised of two plates (10 and 11) connected by a shell (14), the caisson thus formed (10, 11, 14) being supplied with air via a pipe (15), the injectors being placed side by side.

* * * * *